United States Patent
He et al.

(10) Patent No.: US 12,166,284 B2
(45) Date of Patent: Dec. 10, 2024

(54) ANTENNA STRUCTURE, RADAR, AND TERMINAL

(71) Applicant: HUAWEI TECHNOLOGIES CO., LTD., Shenzhen (CN)

(72) Inventors: Yin He, Xi'an (CN); Xiang Gao, Xi'an (CN); Haowei Li, Xi'an (CN); Yiting Liu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 17/946,804

(22) Filed: Sep. 16, 2022

(65) Prior Publication Data

US 2023/0017270 A1 Jan. 19, 2023

Related U.S. Application Data

(63) Continuation of application No. PCT/CN2020/079966, filed on Mar. 18, 2020.

(51) Int. Cl.
*H01Q 21/06* (2006.01)
*H01Q 1/32* (2006.01)
*H01Q 5/371* (2015.01)

(52) U.S. Cl.
CPC .......... *H01Q 21/065* (2013.01); *H01Q 1/3233* (2013.01); *H01Q 5/371* (2015.01)

(58) Field of Classification Search
None
See application file for complete search history.

(56) References Cited

U.S. PATENT DOCUMENTS

| | | | |
|---|---|---|---|
| 2002/0163470 A1* | 11/2002 | Nagumo | H01Q 11/20 343/702 |
| 2006/0049989 A1 | 3/2006 | Mei | |
| 2007/0279303 A1 | 12/2007 | Schoebel | |
| 2009/0058741 A1 | 3/2009 | Shi | |

(Continued)

FOREIGN PATENT DOCUMENTS

| CN | 101019274 A | 8/2007 |
|---|---|---|
| CN | 102422486 A | 4/2012 |

(Continued)

OTHER PUBLICATIONS

Chen et al., "Design of Circular Polarization Microstrip Antenna Array for Anticollision Radar," Research and Progress of SSE, vol. 36, No. 2, Total 6 pages (Apr. 2016). With an English abstract.

*Primary Examiner* — Jany Richardson
(74) *Attorney, Agent, or Firm* — Leydig, Voit & Mayer, Ltd.

(57) ABSTRACT

An antenna structure, a radar, and a terminal may be applied to the field of millimeter-wave radars and can extend a 3 dB bandwidth of the antenna structure. The antenna structure includes: A main feeder and at least one patch unit group, where the at least one patch unit group is connected in series to the main feeder in a length direction of the main feeder, and each of the at least one patch unit group includes at least two patch units disposed in a V-shaped structure. Each patch unit group is connected in series to the main feeder through the two patch units that are disposed in the V-shaped structure and that are in each patch unit group.

20 Claims, 16 Drawing Sheets

(56) References Cited

U.S. PATENT DOCUMENTS

| | | |
|---|---|---|
| 2010/0026584 A1 | 2/2010 | Nakabayashi et al. |
| 2010/0231464 A1* | 9/2010 | Huang ............... H01Q 15/0086 343/702 |
| 2010/0265156 A1 | 10/2010 | Minami et al. |
| 2014/0054383 A1 | 2/2014 | Andrenko et al. |
| 2014/0078006 A1 | 3/2014 | Park et al. |
| 2015/0318621 A1 | 11/2015 | Apostolos et al. |

FOREIGN PATENT DOCUMENTS

| | | |
|---|---|---|
| CN | 103548202 A | 1/2014 |
| CN | 106611898 A | 5/2017 |
| CN | 206211022 U | 5/2017 |
| CN | 208444939 U | 1/2019 |
| CN | 109428161 A | 3/2019 |
| CN | 209624763 U | 11/2019 |
| CN | 110635235 A | 12/2019 |
| DE | 102017201321 A1 | 8/2017 |
| JP | 2000091843 A | 3/2000 |
| JP | 2001044752 A | 2/2001 |
| JP | 2009188683 A | 8/2009 |
| JP | 2015091108 A | 5/2015 |
| JP | 2017188806 A | 10/2017 |
| WO | 2019141412 A1 | 7/2019 |

* cited by examiner

Antenna structure 100

Antenna structure 100

400

┌─────────────────────────────────────────────────────────────┐
│ Etch an antenna structure on a first metal layer, where the antenna structure │
│ includes a main feeder line and at least one patch unit group, the at least one │  S410
│ patch unit group is connected in series to the main feeder line along a length │
│  direction of the main feeder line, each of the at least one patch unit group │
│ includes at least two patch units disposed in a V-shaped structure, and each │
│ patch unit group is connected in series to the main feeder line through the │
│ two patch units that are disposed in the V-shaped structure and that are in │
│                         each patch unit group                         │
└─────────────────────────────────────────────────────────────┘
                                │
                                ▼
┌─────────────────────────────────────────────────────────────┐  S420
│ Bond a first surface of the antenna structure and a first surface of a dielectric │
│                           layer together                           │
└─────────────────────────────────────────────────────────────┘
                                │
                                ▼
┌─────────────────────────────────────────────────────────────┐  S430
│ Bond a second surface of the dielectric layer and a first surface of a second │
│ metal layer together, where the first surface of the dielectric layer is disposed │
│     opposite to the second surface of the dielectric layer, and the antenna     │
│            structure is grounded through the second metal layer            │
└─────────────────────────────────────────────────────────────┘

FIG. 25

ANTENNA STRUCTURE, RADAR, AND TERMINAL

CROSS-REFERENCE TO RELATED APPLICATIONS

This application is a continuation of International Application No. PCT/CN2020/079966, filed on Mar. 18, 2020, the disclosure of which is hereby incorporated by reference in its entirety.

TECHNICAL FIELD

This application relates to the field of sensor technologies, and more specifically, to an antenna structure, a radar, and a terminal in the field of sensor technologies.

BACKGROUND

With development of society and progress of science and technology, intelligent vehicles gradually enter people's daily lives. A sensor plays a very important role in unmanned driving and intelligent driving of an intelligent vehicle. The sensor may be a millimeter-wave radar, a laser radar, an ultrasonic radar, a camera, or the like. For example, as a key sensor of the unmanned driving technology, a 77 GHz millimeter-wave radar has features such as a short wavelength and a small device size. The 77 GHz millimeter-wave radar has irreplaceable advantages in terms of detection precision, detection distance, and device integration.

From perspectives of a detection scenario and an implementation function of the radar, an antenna used by the radar is required to have a wide 3 dB beam bandwidth and a low sidelobe. The wide 3 dB beam bandwidth can ensure a large detection angle range in a horizontal direction, and the low sidelobe can reduce clutter energy reflected by the ground in a vertical direction. Consequently, a false alarm probability is reduced.

FIG. 1 is a schematic diagram of a structure of an existing antenna structure. The existing antenna structure uses a series-feed mode, that is, a plurality of radiation patches that are vertically connected to a feeder are simultaneously excited by using one feeder. Widths of the plurality of radiation patches first gradually increase and then gradually decrease in a longitudinal direction of the feeder, that is, energy radiated by the antenna structure is concentrated in a middle area close to a length of the feeder, so that low sidelobe weighting can be implemented. This avoids radar false alarm.

However, the existing antenna structure shown in FIG. 1 may implement a low sidelobe level, but has a small 3 dB beam width. This leads to a small detection angle range in the horizontal direction.

SUMMARY

Embodiments of this application provide an antenna structure, a radar, and a terminal, to extend a 3 dB bandwidth of the antenna structure.

According to a first aspect, an embodiment of this application provides an antenna structure. The antenna structure includes a main feeder and at least one patch unit group. The at least one patch unit group is connected in series to the main feeder in a longitudinal direction of the main feeder. Each of the at least one patch unit group includes at least two patch units disposed in a V-shaped structure. Each patch unit group is connected in series to the main feeder through the two patch units that are disposed in the V-shaped structure and that are in each patch unit group.

According to the antenna structure provided in this embodiment of this application, each patch unit group is connected in series to the main feeder through the two patch units that are disposed in the V-shaped structure and that are in each patch unit group. Because an included angle exists between the two patch units in the V-shaped structure, an aperture of the antenna structure can be reduced by adjusting the included angle. This can extend a 3 dB bandwidth of the antenna structure.

The following uses an example in which the at least one patch unit group includes a plurality of patch unit groups for description.

Optionally, each patch unit group may be connected in series to the main feeder through the two patch units that are disposed in the V-shaped structure and that are in each patch unit group in a plurality of manners. This is not limited in this embodiment of this application.

In an example implementation, each patch unit group is connected in series to the main feeder through a connection point of the two patch units that are disposed in the V-shaped structure and that are in each patch unit group.

In another example implementation, each patch unit group may be connected in series to the main feeder through a partial region of each of the two patch units that are disposed in the V-shaped structure and that are in each patch unit group.

Optionally, the plurality of patch unit groups may be connected in series to the main feeder in a plurality of manners. This is not limited in this embodiment of this application.

In a first example implementation, the plurality of patch unit groups may be connected in series to a same side of the main feeder.

In a second example implementation, the plurality of patch unit groups may be connected in series to two sides of the main feeder.

According to the antenna structure provided in this embodiment of this application, compared with a case in which the plurality of patch units are connected in series to the same side of the main feeder, a case in which the plurality of patch units are connected in series to the two sides of the main feeder can increase a horizontal radiation range.

Optionally, the plurality of patch unit groups may be connected in series to the two sides of the main feeder in a plurality of manners. This is not limited in this embodiment of this application.

In an example implementation, the plurality of patch unit groups are alternately connected in series to two sides of the main feeder.

In another example implementation, some of the plurality of patch unit groups may be sequentially connected in series to one side of the main feeder, and the rest of patch unit groups may be sequentially connected in series to the other side of the main feeder.

According to the antenna structure provided in this embodiment of this application, an interval between the patch unit groups when the plurality of patch unit groups are connected in series to the two sides of the main feeder is shorter than an interval between the patch unit groups when the plurality of patch unit groups are connected in series to the same side of the main feeder. The plurality of patch unit groups are connected in series to two sides of the main feeder, so that a size of the main feeder can be reduced.

In addition, an interval between the patch unit groups when the plurality of patch unit groups are alternately connected in series to two sides of the main feeder is shorter than an interval between the patch unit groups when some of the plurality of patch unit groups are first connected in series to one side of the main feeder, and the other of patch unit groups are then connected in series to the other side of the main feeder, and an interval between the patch unit groups when the plurality of patch unit groups are connected in series to the same side of the main feeder. Therefore, the plurality of patch unit groups are alternately connected in series to two sides of the main feeder, so that a size of the main feeder can be reduced.

Optionally, widths of the patch units in each patch unit group may be set to different values. This is not limited in this embodiment of this application.

In a first example implementation, a width of a patch unit in the plurality of patch unit groups first increases and then decreases in a first direction.

In a second example implementation, a width of a patch unit in the plurality of patch unit groups increases or decreases in a first direction.

In a third example implementation, a width of a patch unit in the plurality of patch unit groups is the same.

Optionally, widths of patch units in different patch unit groups may be the same or may be different. This is not limited in this embodiment of this application.

It should be noted that, in this embodiment of this application, that the widths of the patch units in the different patch unit groups are the same includes being exactly the same and being approximately the same, where being approximately the same means that a difference between the widths of the patch units in the different patch unit groups is within a specific error range.

According to the antenna structure provided in this embodiment of this application, the widths of the patch units in the patch unit group are designed, so that requirements for different electromagnetic wave radiation shapes can be met. For example, when the width of the patch unit designed in the foregoing first example implementation is used, because energy is concentrated in a middle segment of the main feeder, a low sidelobe can be implemented. This reduces a false alarm probability.

Optionally, an included angle between two patch units that are disposed in a V shape and that are in each patch unit group and an included angle between each patch unit group and the main feeder may be of different sizes. This is not limited in this embodiment of this application.

In an example implementation, the included angle between the two patch units in each patch unit group may be 90°.

In another example implementation, the included angle between each patch unit group and the main feeder may be 45°.

According to the antenna structure provided in this embodiment of this application, the included angle between the two patch units that are disposed in the V-shaped structure and that are in each patch unit is set, so that different aperture requirements of the antenna structure can be met, a horizontal beam width of an antenna can be further broadened, and a low sidelobe requirement of a vertical plane can be further implemented.

Optionally, lengths of the patch units in each patch unit group may be set to be of different sizes. This is not limited in this embodiment of this application.

In a first example implementation, lengths of the patch units in the plurality of patch unit groups first increase and then decrease in a first direction.

In a second example implementation, lengths of the patch units in the plurality of patch unit groups increase or decrease in a first direction.

In a third example implementation, lengths of the patch units in the plurality of patch unit groups are the same.

Optionally, lengths of the patch units in different patch unit groups may be the same or may be different. This is not limited in this embodiment of this application.

It should be noted that, in this embodiment of this application, that the lengths of the patch units in the different patch unit groups are the same includes being exactly the same and being approximately the same, where being approximately the same means that a difference between the lengths of the patch units in the different patch unit groups is within a specific error range.

It should be noted that a size of a patch unit in each patch unit group includes a length and a width.

Optionally, sizes of patch units in different patch unit groups may be the same or may be different. This is not limited in this embodiment of this application.

It should be noted that, in this embodiment of this application, that the sizes of the patch units in the different patch unit groups are the same includes being exactly the same and being approximately the same, where being approximately the same means that a difference between the sizes of the patch units in the different patch unit groups is within a specific error range.

It should be noted that, that each patch unit group includes two patch units disposed in a V-shaped structure may be understood as follows: The two patch units are disposed in a V-shaped structure, or the two patch units are disposed in a similar V-shaped structure. This is not limited in this embodiment of this application.

In an example implementation, the two patch units included in each patch unit group may be of a C-shaped structure.

In another example implementation, the two patch units included in each patch unit group may be of an L-shaped structure.

In an example implementation, the patch unit in each patch unit group may be rectangular.

In another example implementation, the patch unit in each patch unit group may be in the shape of a polygon, for example, a parallelogram.

Optionally, shapes of the patch units in each patch unit group may be the same or may be different. This is not limited in this embodiment of this application.

Optionally, the antenna structure may operate in a standing wave mode or a traveling wave mode. This is not limited in this embodiment of this application.

In a first example implementation, when the antenna structure operates in the standing wave mode, a first end of the antenna structure does not include a load matching unit.

It should be noted that, that a first end of the antenna structure does not include a load matching unit may be understood as that the first end of the antenna structure is open-circuited.

In a second example implementation, when the antenna structure operates in the traveling wave mode, a second end of the antenna structure further includes a load matching unit. The load matching unit is configured to consume energy that is not consumed totally by the at least one patch unit group.

Optionally, the load matching unit may be connected to the first end of the main feeder in a plurality of manners. This is not limited in this embodiment of this application.

In a first example implementation, the load matching unit is in a same longitudinal direction as the main feeder.

In a second example implementation, the load matching unit is connected to the main feeder by bending.

According to the antenna structure provided in this embodiment of this application, flexibility of accessing the load matching unit can be improved by changing a bending angle between the load matching unit and the main feeder.

According to a second aspect, an embodiment of this application further provides a radar. The radar includes the antenna structure according to any one of the first aspect or the example implementations of the first aspect.

In an example implementation, the radar further includes a control chip. The control chip is connected to a second end of the antenna structure. The control chip is configured to control the antenna structure to transmit or receive a signal.

It should be noted that the control chip may be connected to the second end of the antenna structure through a first microstrip line.

In an example implementation, the radar further includes an impedance matching unit. The impedance matching unit is configured to match impedance of the second end with impedance of the control chip, and the control chip is connected to the second end through the impedance matching unit.

It should be noted that the impedance matching unit may be a second microstrip line.

That is, the impedance of the second end of the antenna structure can match the impedance of the control chip by adjusting impedance of the second microstrip line.

In an example implementation, the radar further includes a printed circuit board. The printed circuit board includes the antenna structure, a dielectric layer, and a metal layer that are sequentially disposed in a stacked manner. The antenna structure is grounded through the metal layer.

According to a third aspect, an embodiment of this application further provides a terminal. The terminal includes the radar according to the second aspect or the example implementations of the second aspect.

Optionally, the terminal in this embodiment of this application may have a capability of implementing a communication function and/or a detection function through a radar. This is not limited in this embodiment of this application.

In an example implementation, the terminal may be a vehicle, an unmanned aerial vehicle, an unmanned transport vehicle, a robot, or the like in self-driving or intelligent driving.

In another example implementation, the terminal may be a mobile phone, a tablet computer, a computer with a wireless transceiver function, a virtual reality terminal, an augmented reality terminal, a wireless terminal in industrial control, a wireless terminal in unmanned driving, a wireless terminal in telemedicine, a wireless terminal in a smart grid, a wireless terminal in transportation safety, a wireless terminal in a smart city, a wireless terminal in a smart home, or the like.

According to a fourth aspect, an embodiment of this application further provides a method for producing an antenna apparatus, including: etching an antenna structure on a first metal layer, where the antenna structure includes a main feeder and at least one patch unit group, the at least one patch unit group is connected in series to the main feeder in a longitudinal direction of the main feeder, each of the at least one patch unit group includes at least two patch units disposed in a V-shaped structure, and each patch unit group is connected in series to the main feeder through the two patch units that are disposed in the V-shaped structure and that are in each patch unit group; bonding a first surface of the antenna structure and a first surface of a dielectric layer together; and bonding a second surface of the dielectric layer and a first surface of a second metal layer together, where the first surface of the dielectric layer is disposed opposite to the second surface of the dielectric layer, and the antenna structure is grounded through the second metal layer.

In an example implementation, each patch unit group is connected in series to the main feeder through a connection point of the two patch units that are disposed in the V-shaped structure and that are in each patch unit group.

In an example implementation, a polarization direction of each patch unit group is a horizontal polarization direction.

In an example implementation, the at least one patch unit group includes a plurality of patch unit groups. The plurality of patch unit groups are connected in series to two sides of the main feeder.

In an example implementation, the plurality of patch unit groups are alternately connected in series to the two sides of the main feeder.

In an example implementation, the at least one patch unit group includes a plurality of patch unit groups. A width of a patch unit in the plurality of patch unit groups first increases and then decreases in a first direction. Alternatively, a width of a patch unit in the plurality of patch unit groups increases in a first direction. Alternatively, a width of a patch unit in the plurality of patch unit groups decreases in a first direction.

In an example implementation, the antenna structure is a transmit antenna or a receive antenna.

According to the antenna structure provided in this embodiment of this application, each patch unit group is connected in series to the main feeder through the two patch units that are disposed in the V-shaped structure and that are in each patch unit group. Because an included angle exists between the two patch units in the V-shaped structure, an aperture of the antenna structure can be reduced by adjusting the included angle. This can extend a 3 dB bandwidth of the antenna structure.

BRIEF DESCRIPTION OF DRAWINGS

FIG. 25 is a schematic flowchart of a method 400 for producing an antenna apparatus according to an embodiment of this application.

DESCRIPTION OF EMBODIMENTS

The following describes technical solutions of this application with reference to accompanying drawings.

Figure 1:
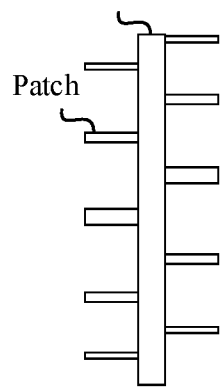
FIG. 1 is a schematic diagram of a structure of an antenna structure in the conventional technology.
Figure 2:
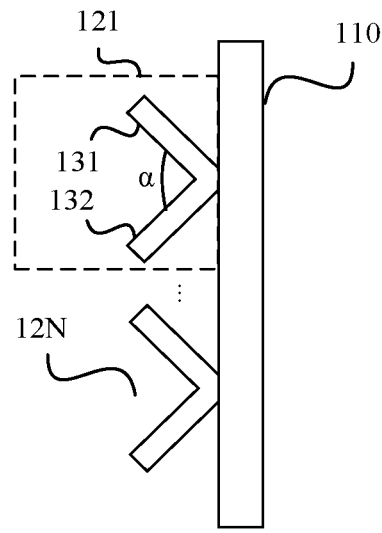
FIG. 2 is a schematic diagram of a structure of an antenna structure 100 according to an embodiment of this application.

FIG. 2 is a schematic diagram of a structure of an antenna structure 100 according to an embodiment of this application. The antenna structure 100 may include a main feeder 110 and at least one patch unit group. FIG. 2 shows a patch unit group 121 to a patch unit group 12N, where N is an integer greater than 1. The patch unit group 121 to the patch unit group 12N are connected in series to the main feeder 110 in a longitudinal direction of the main feeder 110. Each of the patch unit group 121 to the patch unit group 12N includes at least two patch units disposed in a V-shaped structure. As shown in FIG. 2, the patch unit group 121 includes a patch unit 131 and a patch unit 132 that are disposed in a V-shaped structure, and each patch unit group is connected in series to the main feeder 110 through two patch units that are disposed in the V-shaped structure and that are in each patch unit group.

It should be noted that FIG. 2 shows only an example in which the antenna structure 100 includes the patch unit group 121 to the patch unit group 12N. The antenna structure 100 may include only one patch unit group, for example, include only the patch unit group 121. This is not limited in this embodiment of this application.

In an existing antenna structure, a main feeder is vertically connected to a radiation patch in series, and an aperture (that is, a size in a longitudinal direction of the radiation patch) of the antenna structure is large. Therefore, a 3 dB bandwidth of the existing antenna structure is narrow.

It should be noted that dB (decibel) in this embodiment of this application is a unit of a power gain, and the 3 dB bandwidth is a corresponding frequency interval used when a maximum gain of the antenna structure decreases by 3 dB, and belongs to a general definition of a bandwidth of the antenna structure. In this application, an example of the 3 dB bandwidth is used to describe a technical problem and a technical effect. However, this application is not limited to using only the 3 dB bandwidth for description, and any other description used to represent the bandwidth of the antenna structure may replace the 3 dB bandwidth.

According to the antenna structure provided in this embodiment of this application, each patch unit group is connected in series to the main feeder through the two patch units that are disposed in the V-shaped structure and that are in each patch unit group. Because an included angle exists between the two patch units in the V-shaped structure, an aperture of the antenna structure can be reduced by adjusting the included angle. This can extend a 3 dB bandwidth of the antenna structure.

Optionally, each patch unit group may be connected in series to the main feeder through the two patch units that are disposed in the V-shaped structure and that are in each patch unit group in a plurality of manners. This is not limited in this embodiment of this application.

In an example implementation, each patch unit group may be connected in series to the main feeder 110 through a connection point of the two patch units that are disposed in the V-shaped structure and that are in each patch unit group.

For example, in FIG. 2, the patch unit group 121 includes the patch unit 131 and the patch unit 132 that are disposed in a V-shaped structure, and an included angle α exists between the patch unit 131 and the patch unit 132. The patch unit group 121 is connected in series to the main feeder 110 through a connection point at the included angle α between the patch unit 131 and the patch unit 132.

In another example implementation, each patch unit group may be connected in series to the main feeder 110 through a partial region of each of the two patch units that are disposed in the V-shaped structure and that are in each patch unit group.

Figure 3:
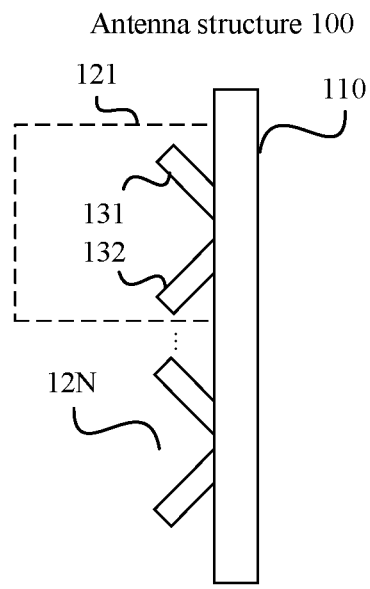
FIG. 3 is another schematic diagram of a structure of an antenna structure 100 according to an embodiment of this application.

For example, in FIG. 3, the patch unit group 121 includes the patch unit 131 and the patch unit 132 that are disposed in a V-shaped structure, and an included angle α exists between the patch unit 131 and the patch unit 132. The patch unit group 121 is connected in series to the main feeder 110 through a partial region at one end of the patch unit 131 and one end of the patch unit 132.

Optionally, the patch unit group 121 to the patch unit group 12N may be connected in series to the main feeder 110 in a plurality of manners. This is not limited in this embodiment of this application.

In a first example implementation, the patch unit group 121 to the patch unit group 12N may be connected in series to a same side of the main feeder 110.

Figure 4:
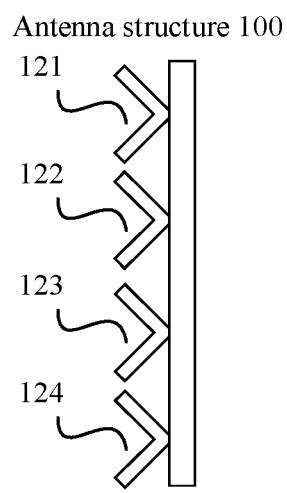
FIG. 4 is still another schematic diagram of a structure of an antenna structure 100 according to an embodiment of this application.

For example, using an example in which the antenna structure 100 includes four patch unit groups, FIG. 4 shows a schematic diagram of the antenna structure 100 in which all the patch unit groups 121 to 124 are connected in series to the left side of the main feeder.

Figure 5:
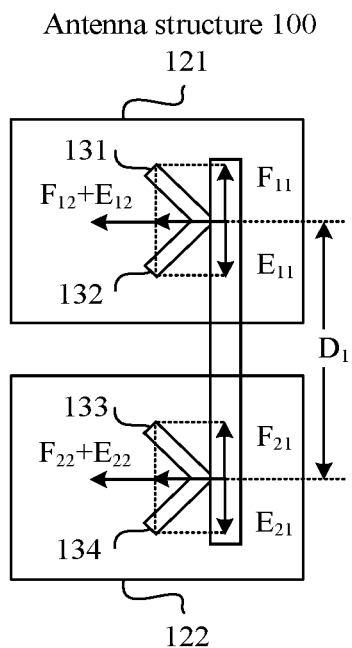
FIG. 5 is still another schematic diagram of a structure of an antenna structure 100 according to an embodiment of this application.

It should be noted that FIG. 5 is a schematic diagram of a polarization direction of the antenna structure 100 in FIG. 4. As shown in FIG. 5, the patch unit group 121 includes the patch unit 131 and the patch unit 132. A polarization direction of the patch unit 131 may be decomposed into a horizontal-left $F_{12}$ and a vertical-up $F_{11}$, and a polarization direction of the patch unit 132 may be decomposed into a horizontal-left $E_{12}$ and a vertical-down $E_{11}$. When both an included angle between the patch unit 131 and the horizontal direction and an included angle between the patch unit 132 and the horizontal direction are 45°, $F_{11}$ and $E_{11}$ of the patch unit 121 counteract each other in the vertical direction, and $F_{12}$ and $E_{12}$ are superposed in the horizontal direction. Therefore, the polarization direction of the patch unit group 121 is horizontally leftward, and a size of the patch unit group 121 is $F_{12}+E_{12}$. Similarly, the polarization direction of the patch unit group 122 is horizontally leftward, and a size of the patch unit group 122 is $F_{22}+E_{22}$.

In addition, in FIG. 5, an interval $D_1$ between the patch unit group 121 and the patch unit group 122 is an integer multiple of a wavelength. In this way, a phase difference between the patch unit group 121 and the patch unit group 122 is 360°, that is, the polarization direction of the patch unit group 121 is same as that of the patch unit group 122. Therefore, an overall polarization direction of the patch unit group 121 and the patch unit group 122 is horizontally leftward, and a size of the patch unit group 121 and the patch unit group 122 is $F_{12}+E_{12}+F_{22}+E_{22}$.

It should be noted that, in FIG. 5, the polarization direction of the antenna structure 100 is described by using only the patch unit group 121 and the patch unit group 122 as an example. When a plurality of patch unit groups included in the antenna structure 100 are connected in series to the left side of the main feeder, the polarization direction of the antenna structure 100 and an interval between patch unit groups are similar to those in FIG. 5. To avoid repetition, details are not described herein again.

In a second example implementation, the patch unit group 121 to the patch unit group 12N may be connected in series to two sides of the main feeder 110.

Optionally, the patch unit group 121 to the patch unit group 12N may be connected in series to the two sides of the main feeder 110 in a plurality of manners. This is not limited in this embodiment of this application.

In an example implementation, the patch unit group 121 to the patch unit group 12N may be alternately connected in series to two sides of the main feeder 110.

Figure 6:
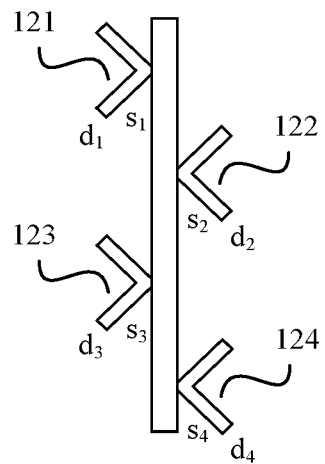
FIG. 6 is still another schematic diagram of a structure of an antenna structure 100 according to an embodiment of this application.

For example, using an example in which the antenna structure 100 includes four patch unit groups, FIG. 6 shows a schematic diagram of the antenna structure 100 in which the patch unit group 121 to the patch unit group 124 are alternately connected in series to two sides of the main feeder.

Figure 7:
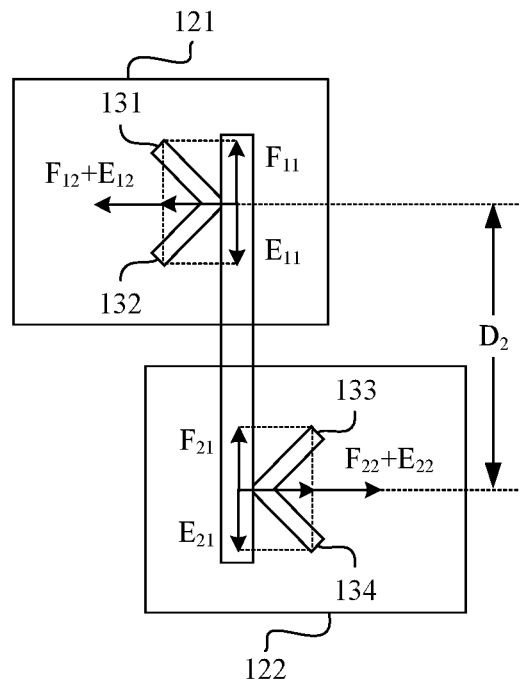
FIG. 7 is still another schematic diagram of a structure of an antenna structure 100 according to an embodiment of this application.

It should be noted that FIG. 7 is a schematic diagram of a polarization direction of the antenna structure 100 in FIG. 6. As shown in FIG. 7, the patch unit group 121 includes the patch unit 131 and the patch unit 132. A polarization direction of the patch unit 131 may be decomposed into a horizontal-left $F_{12}$ and a vertical-up $F_{11}$, and a polarization direction of the patch unit 132 may be decomposed into a horizontal-left $E_{12}$ and a vertical-down $E_{11}$. When both an included angle between the patch unit 131 and the horizontal direction and an included angle between the patch unit 132 and the horizontal direction are 45°, $F_{11}$ and $E_{11}$ of the patch unit 121 counteract each other in the vertical direction, and $F_{12}$ and $E_{12}$ are superposed in the horizontal direction. Therefore, the polarization direction of the patch unit group 121 is horizontally leftward, and a size of the patch unit group 121 is $F_{12}+E_{12}$. Similarly, the polarization direction of the patch unit group 122 is horizontally rightward, and a size of the patch unit group 122 is $F_{22}+E_{22}$.

In addition, in FIG. 7, an interval $D_2$ between the patch unit group 121 and the patch unit group 122 is an odd multiple of a half wavelength. In this way, a phase difference between the patch unit group 121 and the patch unit group 122 is 180°, that is, the polarization direction of the patch unit group 121 is opposite to that of the patch unit group 122. Therefore, an overall polarization direction of the patch unit group 121 and the patch unit group 122 is horizontally leftward (or rightward), and a size of the patch unit group 121 and the patch unit group 122 is $F_{12}+E_{12}+F_{22}+E_{22}$.

It should be noted that, in FIG. 7, the polarization direction of the antenna structure 100 is described by using only the patch unit group 121 and the patch unit group 122 as an example. When a plurality of patch unit groups included in the antenna structure 100 are alternately connected in series to the left side of the main feeder, the polarization direction of the antenna structure 100 and an interval between patch unit groups are similar to those in FIG. 7. To avoid repetition, details are not described herein again.

In another example implementation, some of the patch unit groups 121 to 12N may be sequentially connected in series to one side of the main feeder 110, and the rest of patch unit groups may be sequentially connected in series to the other side of the main feeder 110.

Figure 8:
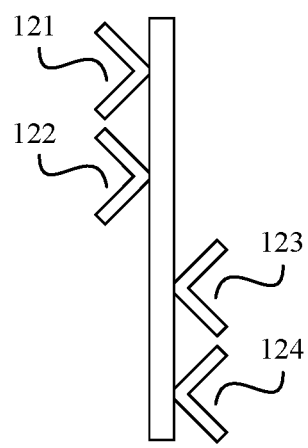
FIG. 8 is still another schematic diagram of a structure of an antenna structure 100 according to an embodiment of this application.

For example, the antenna structure 100 includes four patch unit groups. FIG. 8 is a schematic diagram of the antenna structure 100 in which the patch unit group 121 and the patch unit group 122 are connected in series to the left side of the main feeder, and the patch unit group 123 and the patch unit group 124 are connected in series to the right side of the main feeder.

It should be noted that, for polarization directions and intervals of the patch unit group 121 to the patch unit group 124 in FIG. 8, refer to FIG. 5 and FIG. 7. To avoid repetition, details are not described herein again.

According to the antenna structure provided in this embodiment of this application, an interval between patch unit groups when the patch unit group 121 to the patch unit group 12N are connected in series to two sides of the main feeder 110 is shorter than an interval between patch unit groups when the patch unit group 121 to the patch unit group 12N are connected in series to the same side of the main feeder 110. Therefore, the patch unit group 121 to the patch unit group 12N are connected in series to two sides of the main feeder, so that the size of the main feeder can be reduced.

In addition, an interval between the patch unit groups when the patch unit group 121 to the patch unit group 12N are alternately connected in series to two sides of the main feeder 110 is shorter than an interval between the patch unit groups when some of the patch unit group 121 to the patch unit group 12N are first connected in series to one side of the main feeder 110, and the other of the patch unit group 121 to the patch unit group 12N are then connected in series to the other side of the main feeder 110, and an interval between the patch unit groups when the patch unit group 121 to the patch unit group 12N are connected in series to the same side of the main feeder 110. Therefore, the patch unit groups 121 to 12N are alternately connected in series to two sides of the main feeder 110, so that the size of the main feeder can be reduced.

Optionally, widths of the patch units in each patch unit group may be set to different values. This is not limited in this embodiment of this application.

In a first example implementation, widths of the patch units in the patch unit group 121 to the patch unit group 12N first increase and then decrease in a first direction.

It should be noted that the first direction may be a longitudinal direction of the main feeder.

Figure 9:
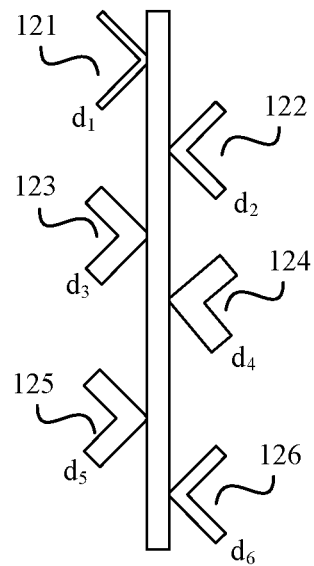
FIG. 9 is still another schematic diagram of a structure of an antenna structure 100 according to an embodiment of this application.

For example, as shown in FIG. 9, the antenna structure 100 includes the patch unit group 121 to a patch unit group 126, widths of patch units in the patch unit group 121 to the patch unit group 126 are sequentially $d_1$ to $d_6$, and $d_1 < d_2 < d_3 < d_4 > d_5 > d_6$.

Figure 10:
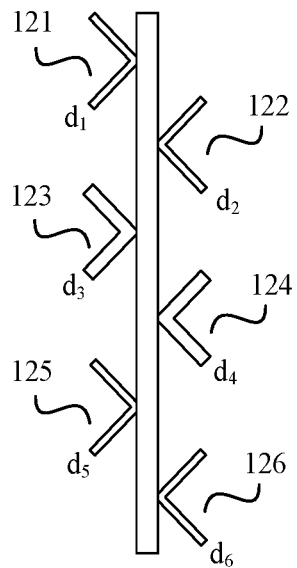
FIG. 10 is still another schematic diagram of a structure of an antenna structure 100 according to an embodiment of this application.

For another example, as shown in FIG. 10, the antenna structure 100 includes the patch unit group 121 to the patch unit group 126, widths of patch units in the patch unit group 121 to the patch unit group 126 are sequentially $d_1$ to $d_6$, and $d_1 = d_2 < d_3 = d_4 > d_5 = d_6$.

In a second example implementation, widths of patch units in the patch unit group 121 to the patch unit group 12N increase or decrease in the first direction.

Figure 11:
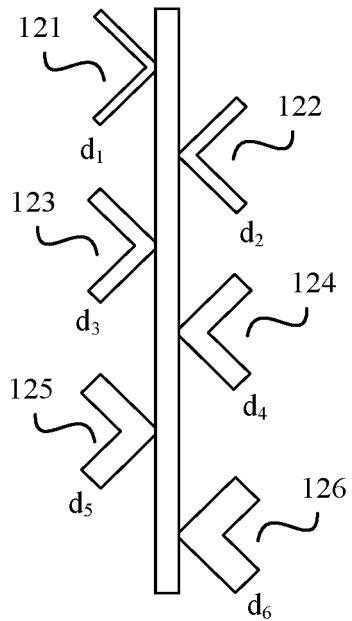
FIG. 11 is still another schematic diagram of a structure of an antenna structure 100 according to an embodiment of this application.

For example, as shown in FIG. 11, the antenna structure 100 includes the patch unit group 121 to the patch unit group 126, widths of patch units in the patch unit group 121 to the patch unit group 126 are sequentially $d_1$ to $d_6$, and $d_1 < d_2 < d_3 < d_4 < d_5 < d_6$.

In a third example implementation, widths of the patch units in the patch unit group 121 to the patch unit group 12N are the same.

For example, as shown in FIG. 6, the antenna structure 100 includes the patch unit group 121 to the patch unit group 124, widths of patch units in the patch unit group 121 to the patch unit group 124 are sequentially $d_1$ to $d_4$, and $d_1 = d_2 = d_3 = d_4$.

Optionally, widths of patch units in different patch unit groups may be the same or may be different. This is not limited in this embodiment of this application.

It should be noted that, in this embodiment of this application, that the widths of the patch units in the different patch unit groups are the same includes being exactly the same and being approximately the same, where being approximately the same means that a difference between the widths of the patch units in the different patch unit groups is within a specific error range.

According to the antenna structure provided in this embodiment of this application, the widths of the patch units in the patch unit group are designed, so that requirements for different electromagnetic wave radiation shapes can be met. For example, when the width of the patch unit designed in the foregoing first example implementation is used, because energy is concentrated in a middle segment of the main feeder, a low sidelobe can be implemented. This reduces a false alarm probability.

Optionally, an included angle between two patch units that are disposed in a V shape and that are in each patch unit group and an included angle between each patch unit group and the main feeder may be of different sizes. This is not limited in this embodiment of this application.

In an example implementation, the included angle between the two patch units in each patch unit group may be 90°.

In another example implementation, the included angle between each patch unit group and the main feeder may be 45°.

According to the antenna structure provided in this embodiment of this application, the included angle between the two patch units that are disposed in the V-shaped structure and that are in each patch unit is set, so that different aperture requirements of the antenna structure can be met, a horizontal beam width of an antenna can be further broadened, and a low sidelobe requirement of a vertical plane can be further implemented.

Optionally, lengths of the patch units in each patch unit group may be set to be of different sizes. This is not limited in this embodiment of this application.

In a first example implementation, lengths of the patch units in the patch unit group 121 to the patch unit group 12N first increase and then decrease in a first direction.

It should be noted that the first direction may be a longitudinal direction of the main feeder.

Figure 12:
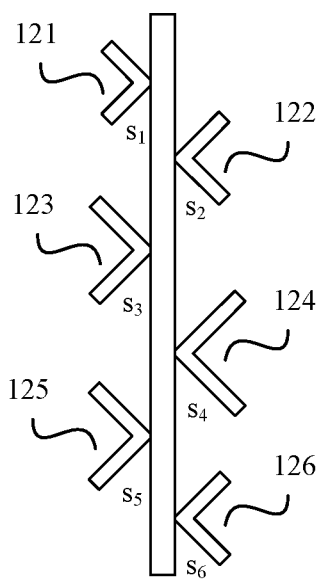
FIG. 12 is still another schematic diagram of a structure of an antenna structure 100 according to an embodiment of this application.

For example, as shown in FIG. 12, the antenna structure 100 includes the patch unit group 121 to the patch unit group 126, lengths of patch units in the patch unit group 121 to the patch unit group 126 are sequentially $s_1$ to $s_6$, and $s_1 < s_2 < s_3 < s_4 > s_5 > s_6$.

Figure 13:
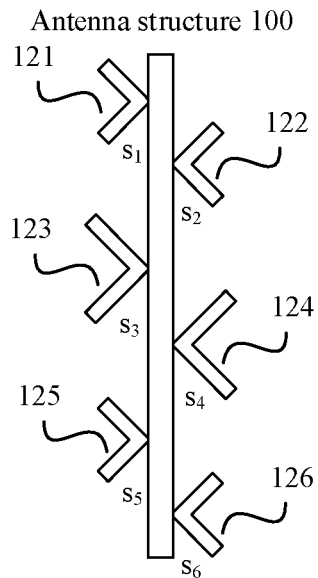
FIG. 13 is still another schematic diagram of a structure of an antenna structure 100 according to an embodiment of this application.

For another example, as shown in FIG. 13, the antenna structure 100 includes the patch unit group 121 to the patch unit group 126, lengths of patch units in the patch unit group 121 to the patch unit group 126 are sequentially $s_1$ to $s_6$, and $s_1 = s_2 < s_3 = s_4 > s_5 = s_6$.

In a second example implementation, lengths of the patch units in the patch unit group 121 to the patch unit group 12N increase or decrease in a first direction.

Figure 14:
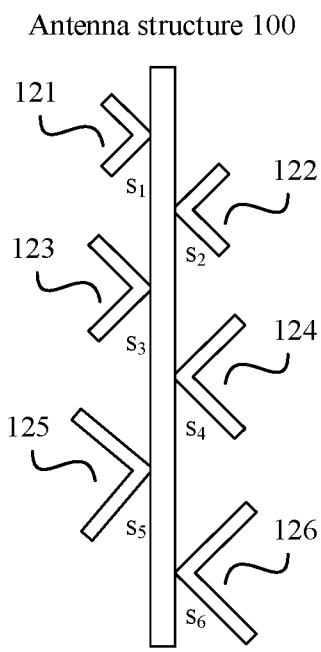
FIG. 14 is still another schematic diagram of a structure of an antenna structure 100 according to an embodiment of this application.

For example, as shown in FIG. 14, the antenna structure 100 includes the patch unit group 121 to the patch unit group 126, lengths of the patch units in the patch unit group 121 to the patch unit group 126 are sequentially $s_1$ to $s_6$, and $s_1 < s_2 < s_3 < s_4 < s_5 < s_6$.

In a third example implementation, lengths of the patch units in the patch unit group 121 to the patch unit group 12N are the same.

For example, as shown in FIG. 6, the antenna structure 100 includes the patch unit group 121 to the patch unit group 124, lengths of the patch units in the patch unit group 121 to the patch unit group 124 are sequentially $s_1$ to $s_4$, and $s_1 = s_2 = s_3 = s_4$.

Optionally, lengths of patch units in different patch unit groups may be the same or may be different. This is not limited in this embodiment of this application.

It should be noted that, in this embodiment of this application, that the lengths of the patch units in the different patch unit groups are the same includes being exactly the same and being approximately the same, where being approximately the same means that a difference between the lengths of the patch units in the different patch unit groups is within a specific error range.

It should be noted that a size of a patch unit in each patch unit group includes a length and a width.

Optionally, sizes of patch units in different patch unit groups may be the same or may be different. This is not limited in this embodiment of this application.

Figure 15:
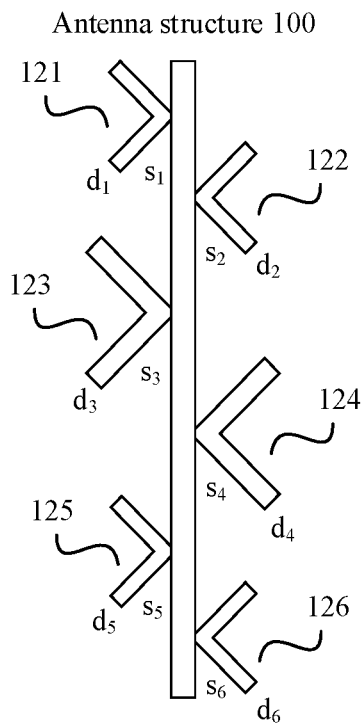
FIG. 15 is still another schematic diagram of a structure of an antenna structure 100 according to an embodiment of this application.

For example, as shown in FIG. 15, the antenna structure 100 includes the patch unit group 121 to the patch unit group 126. Lengths of the patch units in the patch unit group 121 to the patch unit group 126 are sequentially $s_1$ to $s_6$, and widths of the patch units are sequentially $d_1$ to $d_6$, where $s_1 < s_2 < s_3 < s_4 < s_5 < s_6$ and $d_1 = d_2 < d_3 = d_4 > d_5 = d_6$.

It should be noted that, in this embodiment of this application, that the sizes of the patch units in the different patch unit groups are the same includes being exactly the same and being approximately the same, where being approximately the same means that a difference between the sizes of the patch units in the different patch unit groups is within a specific error range.

It should be noted that, that each patch unit group includes two patch units disposed in a V-shaped structure may be understood as follows: The two patch units are disposed in a V-shaped structure, or the two patch units are disposed in a similar V-shaped structure. This is not limited in this embodiment of this application.

In an example implementation, the two patch units included in each patch unit group may be of a C-shaped structure.

In another example implementation, the two patch units included in each patch unit group may be of an L-shaped structure.

Figure 16:
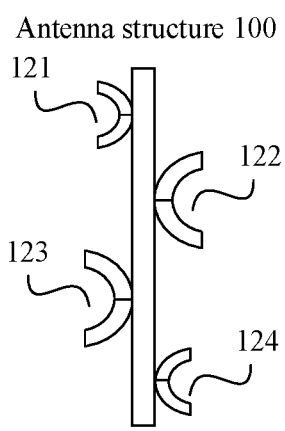
FIG. 16 is still another schematic diagram of a structure of an antenna structure 100 according to an embodiment of this application.

For example, FIG. 16 is still another schematic diagram of a structure of the antenna structure 100. The antenna structure 100 includes the patch unit group 121 to the patch unit group 124. Each patch unit group includes two patch units disposed in a C-shaped structure.

Optionally, the patch units in each patch unit group may have a plurality of different shapes. This is not limited in this embodiment of this application.

In an example implementation, the patch unit in each patch unit group may be rectangular, as shown in FIG. 1 to FIG. 15.

Figure 17:
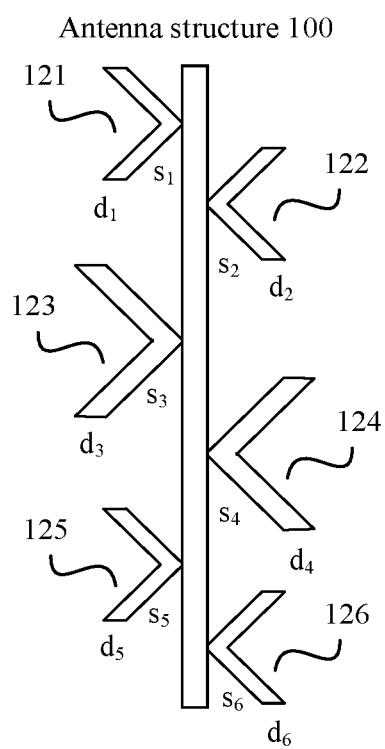
FIG. 17 is still another schematic diagram of a structure of an antenna structure 100 according to an embodiment of this application.

In another example implementation, the patch unit in each patch unit group may be in the shape of a polygon, for example, a parallelogram, as shown in FIG. 17.

Optionally, shapes of the patch units in each patch unit group may be the same or may be different. This is not limited in this embodiment of this application.

Optionally, the antenna structure may operate in a standing wave mode or a traveling wave mode. This is not limited in this embodiment of this application.

It should be noted that a standing wave and a traveling wave are phenomena that appear in a wave propagation process.

Traveling wave: A wave is transmitted from a wave source.

For example, if an equal amplitude high-frequency alternating current power supply is used to drive a pair of infinitely long parallel wires, there is a high-frequency alternating voltage and a high-frequency alternating current that are synchronized with the power supply in a conducting wire near a power supply end. For each section of a conducting wire, a current flowing through is a high-frequency alternating current of a same amplitude, but a time phase of the current flowing through each section is different. For the entire conducting wire, a current at each point at a same moment is in sinusoidal distribution with a distance from the power supply end. It seems that a sinusoidal current wave continuously flows from the infinite end to the power supply along a conducting wire, and then from the power supply to the infinite end along another conducting wire. This flow mode of the current wave is called a traveling wave.

It should be noted that a maximum beam direction angle of the antenna structure changes with a frequency. This phenomenon is referred to as frequency scanning. In the traveling wave mode, a frequency scanning range of the antenna structure can be reduced.

Standing wave: A wave is reflected back and forth in space. The reflected wave interferes with a subsequent wave to form a stable interference field. An amplitude of each part is stable. A location where the amplitude is zero is called a wave node, and a location where the amplitude is the largest is called a wave abdomen.

For example, in the foregoing case in which an equal-amplitude high-frequency alternating current power supply is used to drive a pair of infinitely long evenly parallel wires. Because the conducting wire is infinitely long, a current wave (and actually a voltage wave) excited by the power supply flows far along the conducting wire and never turns back. However, if lengths of the parallel wires are limited, an end boundary destroys an original state of the current wave and the voltage wave. If a current in a conducting wire at an open circuit end is always zero, a voltage between conducting wires at a short circuit end is always zero. Then, this boundary state will affect other parts in a reverse direction along the long wire, to disturb the original traveling wave state. This disturbance can also be considered as energy transmitted from the power supply because the energy cannot be transmitted continuously and there is no place to use up the energy. Therefore, the energy can only be reflected back. For the entire conducting wire, a voltage and a current at each point have a same phase and each point has its own fixed amplitude. It seems that the voltage wave and current wave do not move along the conducting wire. This flow mode of the current wave is called a standing wave.

It should be further noted that, load matching means a maximum output power from a perspective of power, that is, in a power supply circuit, load impedance is equal to a conjugate value of impedance in the power supply (resistances are equal, reactances are equal, and symbols are opposite). The purpose of matching is to obtain the maximum output power. From a perspective of a transmission line, it means lossless transmission, that is, on the transmission line, load impedance is equal to characteristic impedance of the transmission line, which is called "matching". The purpose of matching is to eliminate a reflection caused by load, avoid a standing wave, and enable the load to obtain maximum power.

Therefore, in the standing wave mode, transmission of a signal from a signal source to load may be maximized only when load impedance matches impedance of the signal source. Using a base station system as an example, a signal source is a transmitter, load is an antenna feeder subsystem, and the antenna feeder subsystem includes auxiliary devices such as an antenna, a feeder, a radio frequency connector, and a lightning arrester. Otherwise, if the load does not match the signal source, some signals will be reflected back to the signal source, which is undesirable. In this case, a forward wave and a reverse wave are generated, and the two signals are combined to form a standing wave.

It should be noted that, designing appropriate matched load impedance in the standing wave mode can eliminate an energy loss caused by the reflection caused by the load.

In a first example implementation, when the antenna structure operates in the standing wave mode, a first end of the antenna structure does not include a load matching unit.

It should be noted that, that a first end of the antenna structure does not include a load matching unit may be understood as that the first end of the antenna structure is open-circuited.

For example, all the antenna structures 100 shown in FIG. 1 to FIG. 17 are antenna structures working in the standing wave mode.

In a second example implementation, when the antenna structure operates in the traveling wave mode, a second end of the antenna structure further includes a load matching unit. The load matching unit is configured to consume energy that is not consumed totally by the at least one patch unit group.

Optionally, the load matching unit may be connected to the first end of the main feeder in a plurality of manners. This is not limited in this embodiment of this application.

In a first example implementation, the load matching unit is in a same longitudinal direction as the main feeder.

Figure 18:
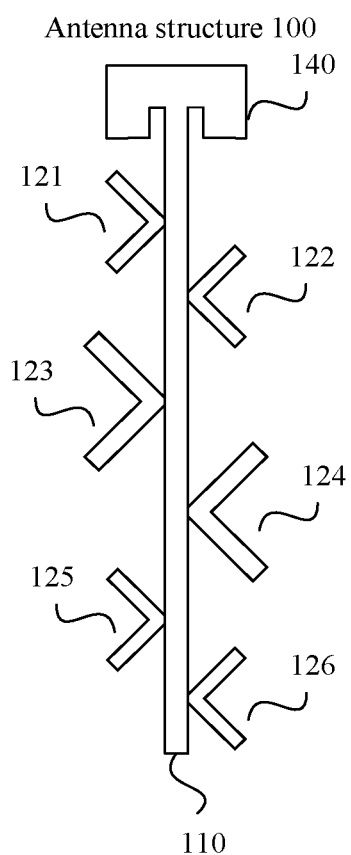
FIG. 18 is still another schematic diagram of a structure of an antenna structure 100 according to an embodiment of this application.

FIG. 18 is still another schematic diagram of a structure of the antenna structure 100 according to an embodiment of this application. As shown in FIG. 18, a first end of the antenna structure includes a load matching unit 140, and a longitudinal direction of the load matching unit 140 is the same as a longitudinal direction of the main feeder 110.

In a second example implementation, the load matching unit is connected to the main feeder by bending.

Figure 19:
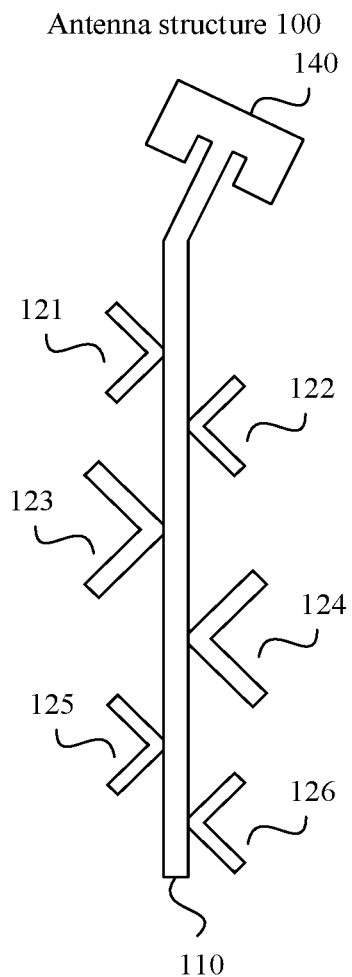
FIG. 19 is still another schematic diagram of a structure of an antenna structure 100 according to an embodiment of this application.

FIG. 19 is still another schematic diagram of a structure of the antenna structure 100 according to an embodiment of this application. As shown in FIG. 19, a first end of the antenna structure includes a load matching unit 140, and the load matching unit 140 connected to the main feeder 110 by bending, that is, an included angle exists between the load matching unit 140 and the main feeder 110.

According to the antenna structure provided in this embodiment of this application, flexibility of accessing the load matching unit can be improved by changing a bending angle between the load matching unit and the main feeder.

Optionally, the antenna structure may be a receive antenna or a transmit antenna. This is not limited in this embodiment of this application.

According to the antenna structure provided in this embodiment of this application, a left sidelobe level of a beam can be −21.2 dB, a right sidelobe level of a beam can be −17.8 dB, and a 3 dB beam width can be 97°.

The foregoing describes the antenna structure 100 provided in embodiments of this application with reference to FIG. 1 to FIG. 19. The following describes a radar provided in embodiments of this application.

Figure 20:
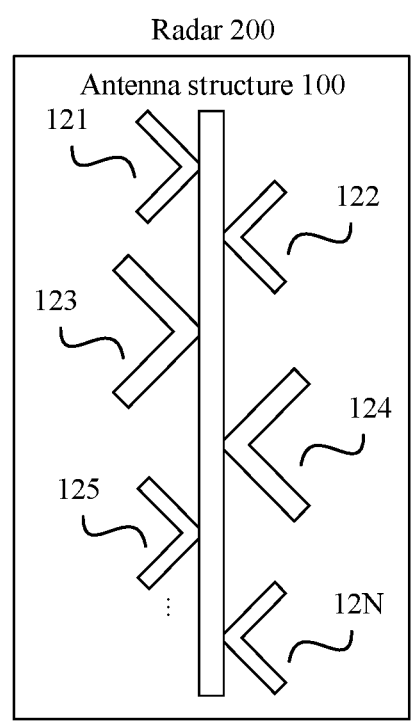
FIG. 20 is a schematic diagram of a structure of a radar 200 according to an embodiment of this application.

FIG. 20 is a schematic diagram of a structure of a radar 200 according to an embodiment of this application. The radar 300 may include the antenna structure 100 shown in FIG. 2 to FIG. 19.

Figure 21:
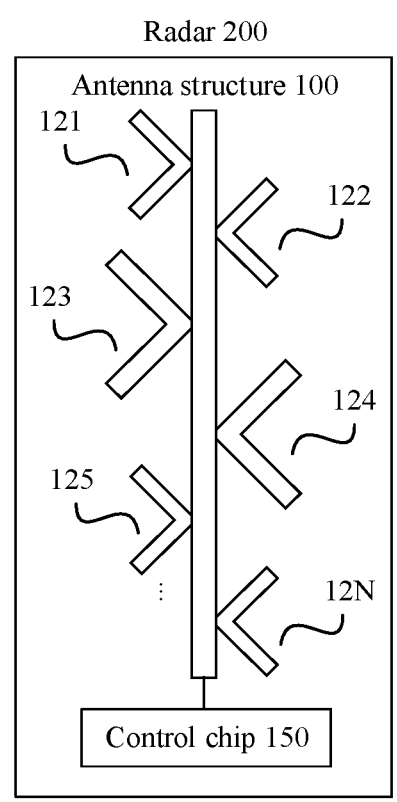
FIG. 21 is another schematic diagram of a structure of a radar 200 according to an embodiment of this application.

Optionally, as shown in FIG. 21, the radar 200 further includes a control chip 150. The control chip 150 is connected to a second end of the antenna structure, and the control chip 150 is configured to control the antenna structure to transmit or receive a signal.

It should be noted that the control chip 150 may be connected to the second end of the antenna structure through a first microstrip line.

Figure 22:
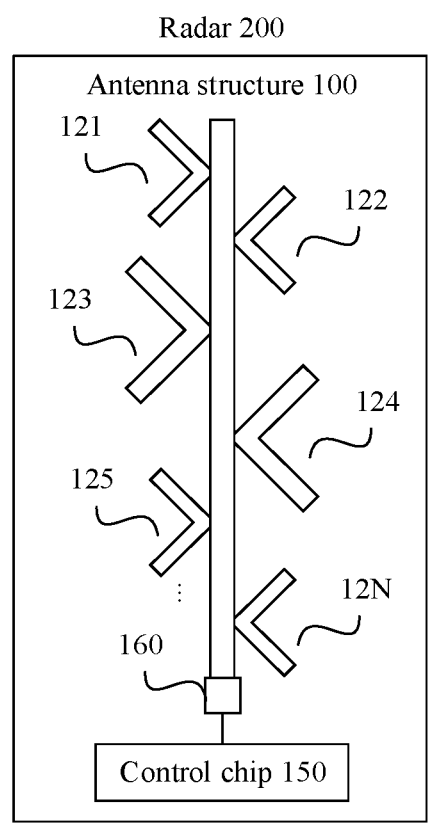
FIG. 22 is still another schematic diagram of a structure of a radar 200 according to an embodiment of this application.

Optionally, as shown in FIG. 22, the radar 200 further includes an impedance matching unit 160. The impedance matching unit 160 is configured to match impedance of the second end with impedance of the control chip 150, and the control chip 150 is connected to the second end through the impedance matching unit.

It should be noted that the impedance matching unit may be a second microstrip line.

That is, the impedance of the second end of the antenna structure can match the impedance of the control chip by adjusting impedance of the second microstrip line.

Figure 23:
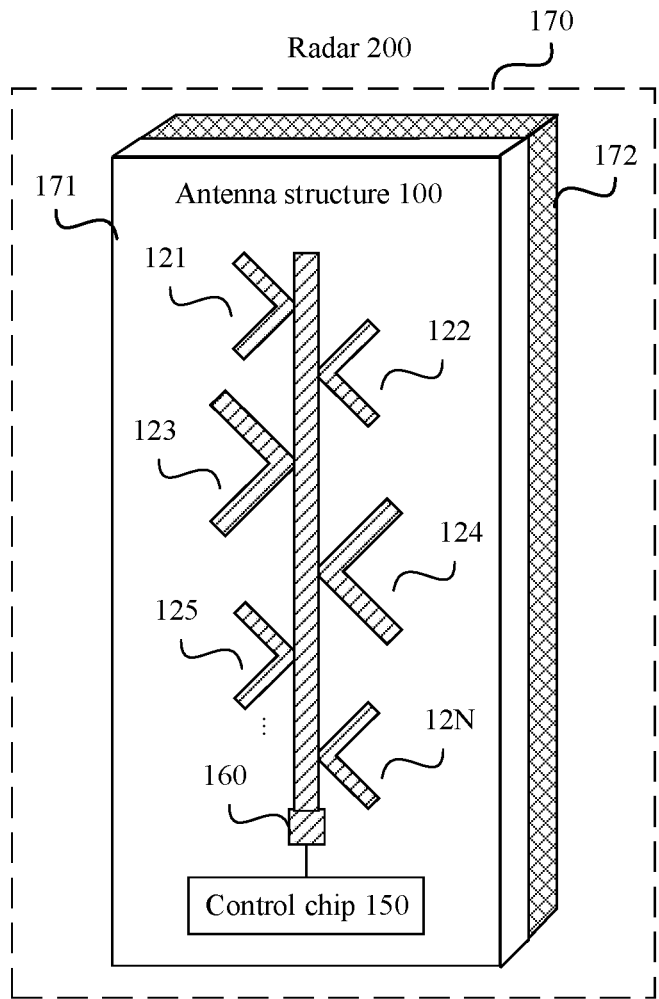
FIG. 23 is still yet another schematic diagram of a structure of a radar 200 according to an embodiment of this application.

Optionally, as shown in FIG. 23, the radar 200 further includes a printed circuit board 170. The printed circuit board 170 includes the antenna structure 100 (shown as  in FIG. 23), a dielectric layer 171 (shown as  in FIG. 23), and a metal layer 172 (shown as  in FIG. 23) that are sequentially disposed in a stacked manner. The antenna structure is grounded through the metal layer.

Figure 24:
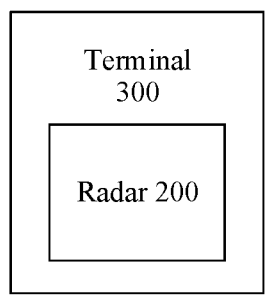
FIG. 24 is a schematic diagram of a structure of a terminal 300 according to an embodiment of this application.

FIG. 24 shows a terminal 300 according to an embodiment of this application. The terminal 300 includes the radar 200 described in FIG. 20 to FIG. 23.

Optionally, the terminal in this embodiment of this application may have a capability of implementing a communication function and/or a detection function through a radar. This is not limited in this embodiment of this application.

In an example implementation, the terminal may be a vehicle, an unmanned aerial vehicle, an unmanned transport vehicle, a robot, or the like in self-driving or intelligent driving.

In another example implementation, the terminal may be a mobile phone, a tablet computer (pad), a computer with a wireless transceiver function, a virtual reality (VR) terminal, or an augmented reality (AR) terminal, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, and the like.

The foregoing shows the radar and the terminal provided in embodiments of this application with reference to FIG. 20 to FIG. 24. The following describes a method for producing an antenna apparatus in an embodiment of this application with reference to FIG. 25 in detail.

FIG. 25 shows a method 400 for producing an antenna apparatus according to an embodiment of this application. The method 400 includes the following steps S410 to S430.

S410. Etch an antenna structure on a first metal layer, where the antenna structure includes a main feeder and at least one patch unit group, and the at least one patch unit group is connected in series to the main feeder in a longitudinal direction of the main feeder; each of the at least one patch unit group includes at least two patch units disposed in a V-shaped structure, and each patch unit group is connected in series to the main feeder through the two patch units that are in the V-shaped structure and that are on each patch unit group.

S420. Bond a first surface of the antenna structure and a first surface of the dielectric layer together.

S430. Bond a second surface of the dielectric layer and a first surface of a second metal layer together, where the first surface of the dielectric layer is disposed opposite to the second surface of the dielectric layer, and the antenna structure is grounded through the second metal layer.

Optionally, each patch unit group is connected in series to the main feeder through a connection point of the two patch units that are disposed in the V-shaped structure and that are in each patch unit group.

Optionally, a polarization direction of each patch unit group is a horizontal polarization direction.

Optionally, the at least one patch unit group includes a plurality of patch unit groups, and the plurality of patch unit groups are connected in series to two sides of the main feeder.

Optionally, the plurality of patch unit groups are alternately connected in series to two sides of the main feeder.

Optionally, the at least one patch unit group includes a plurality of patch unit groups. A width of a patch unit in the plurality of patch unit groups first increases and then decreases in a first direction. Alternatively, a width of a patch unit in the plurality of patch unit groups increases in a first direction. Alternatively, a width of a patch unit in the plurality of patch unit groups decreases in a first direction.

According to the antenna structure provided in this embodiment of this application, each patch unit group is connected in series to the main feeder through the two patch units that are disposed in the V-shaped structure and that are in each patch unit group. Because an included angle exists between the two patch units in the V-shaped structure, an aperture of the antenna structure can be reduced by adjusting the included angle. This can extend a 3 dB bandwidth of the antenna structure.

Persons of ordinary skill in the art may be aware that, in combination with the examples described in embodiments disclosed in this specification, units and algorithm steps may be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on an actual requirement to achieve objectives of solutions in embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, technical solutions of this application may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by persons skilled in the art within the technical scope disclosed in this application may fall within the protection scope of this application.

What is claimed is:

1. An antenna structure, comprising:
a main feeder; and
a plurality of patch unit groups connected to the main feeder in series along a longitudinal direction of the main feeder; and
wherein each patch unit group of the plurality of patch unit groups comprises two patch units disposed in a V-shaped structure; and
wherein the plurality of patch unit groups are connected to two sides of the main feeder.

2. The antenna structure according to claim 1, wherein each patch unit group of the plurality of patch unit groups is connected to the main feeder through a connection point of the two patch units of the patch unit group.

3. The antenna structure according to claim 1, wherein a polarization direction of each patch unit group of the plurality of patch unit groups is horizontal.

4. The antenna structure according to claim 1, wherein the antenna structure is part of a radar.

5. The antenna structure according to claim 1, wherein the plurality of patch unit groups are alternately connected to the two sides of the main feeder.

6. The antenna structure according to claim 1,
wherein, in the longitudinal direction of the main feeder, widths of patch units connected to the main feeder (a) increase then decrease, (b) increase, or (c) decrease.

7. The antenna structure according to claim 1, wherein the antenna structure is a receive antenna or a transmit antenna.

8. The antenna structure according to claim 4, wherein the radar further comprises:
a control chip connected to a second end of the antenna structure, wherein the control chip is configured to control the antenna structure to transmit or receive a signal.

9. The antenna structure according to claim 8, wherein the radar further comprises:
an impedance matching unit configured to match impedance of the second end of the antenna structure with impedance of the control chip, wherein the control chip is connected to the second end of the antenna structure through the impedance matching unit.

10. The antenna structure according to claim 4, wherein the radar further comprises:
a printed circuit board;
wherein the printed circuit board comprises the antenna structure, a dielectric layer, and a metal layer that are sequentially disposed in a stacked manner, and the antenna structure is grounded through the metal layer.

11. An antenna structure, comprising:
a main feeder; and
a plurality of patch unit groups connected to the main feeder in series along a longitudinal direction of the main feeder; and
wherein each patch unit group of the plurality of patch unit groups comprises two patch units disposed in a V-shaped structure;

wherein, in the longitudinal direction of the main feeder, widths of patch units connected to the main feeder (a) increase then decrease, (b) increase, or (c) decrease.

12. The antenna structure according to claim 11, wherein the antenna structure is part of a radar.

13. The antenna structure according to claim 11, wherein a polarization direction of each patch unit group of the plurality of patch unit groups is horizontal.

14. A method for producing an antenna apparatus, comprising:
   etching an antenna structure on a first metal layer, wherein the antenna structure comprises a main feeder and at least one patch unit group connected to the main feeder, wherein each patch unit group of the at least one patch unit group comprises two patch units disposed in a V-shaped structure;
   bonding a first surface of the antenna structure and a first surface of a dielectric layer together; and
   bonding a second surface of the dielectric layer and a first surface of a second metal layer together, wherein the first surface of the dielectric layer is disposed opposite to the second surface of the dielectric layer, and the antenna structure is grounded through the second metal layer.

15. The method according to claim 14, wherein each patch unit group of the at least one patch unit group is connected to the main feeder through a connection point of the two patch units of the patch unit group.

16. The method according to claim 14, wherein a polarization direction of each patch unit group of the at least one patch unit group is horizontal.

17. The method according to claim 14, wherein the at least one patch unit group comprises a plurality of patch unit groups connected to the main feeder in series in a longitudinal direction of the main feeder, and the plurality of patch unit groups are connected to two sides of the main feeder.

18. The method according to claim 17, wherein the plurality of patch unit groups are alternately connected to the two sides of the main feeder.

19. The method according to claim 14, wherein the at least one patch unit group comprises a plurality of patch unit groups connected to the main feeder in series in a longitudinal direction of the main feeder; and
   wherein, in the longitudinal direction of the main feeder, widths of patch units connected to the main feeder (a) increase then decrease, (b) increase, or (c) decrease.

20. The method according to claim 14, wherein the antenna structure is a transmit antenna or a receive antenna.

* * * * *